(12) United States Patent
Guillet et al.

(10) Patent No.: US 10,041,808 B2
(45) Date of Patent: Aug. 7, 2018

(54) METHOD OF SENSOR DATA FUSION

(71) Applicant: AIRBUS OPERATIONS (S.A.S.), Toulouse (FR)

(72) Inventors: Alain Guillet, Blagnac (DE); Ahmed Taha Zaari Jabiri, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 344 days.

(21) Appl. No.: 14/623,085

(22) Filed: Feb. 16, 2015

(65) Prior Publication Data
US 2015/0233730 A1    Aug. 20, 2015

(30) Foreign Application Priority Data
Feb. 18, 2014  (FR) .................... 14 51290

(51) Int. Cl.
*G01C 23/00*  (2006.01)
*B64D 43/02*  (2006.01)

(52) U.S. Cl.
CPC ............ *G01C 23/00* (2013.01); *B64D 43/02* (2013.01)

(58) Field of Classification Search
None
See application file for complete search history.

(56) References Cited

U.S. PATENT DOCUMENTS

| 5,661,735 A * | 8/1997 | Fischer | G01D 3/08 367/124 |
| 2005/0228619 A1 * | 10/2005 | Burnet | G05B 9/03 702/189 |
| 2008/0276155 A1 * | 11/2008 | Shim | G01C 21/16 714/800 |

OTHER PUBLICATIONS

Brumback et al, "A Fault-Tolerant Multisensor Navigation System Design," IEEE Transactions on Aerospace and Electronic Systems, Nov. 1987, vol. 10, No. 6, pp. 738-756, IEEE Service Center, Piscataway, NJ, US.

(Continued)

*Primary Examiner* — Ryan Rink
*Assistant Examiner* — Paul A Castro
(74) *Attorney, Agent, or Firm* — Jenkins, Wilson, Taylor & Hunt, P.A.

(57) ABSTRACT

A method for merging measurements of a flight parameter of an aircraft, from measurements ($y_1$, $y_2$, $y_3$, $y_4$) of this parameter supplied respectively by a plurality of sensors ($C_1$, $C_2$, $C_3$, $C_4$), comprising: for each sensor ($C_1$; $C_2$; $C_3$; $C_4$), computing a deviation ($T_1$; $T_2$; $T_3$; $T_4$), proportional to the absolute value of a difference between a measurement ($y_1$, $y_2$, $y_3$; $y_4$) supplied by this sensor, and an estimation of the parameter computed from the measurements supplied by the other sensors; comparing each deviation to a corresponding threshold ($T_{d1}$; $T_{d2}$; $T_{d3}$; $T_{d4}$); based on the comparisons, determining the presence or not of an anomaly on one of the sensors with a determined total probability of false alarm; and merging measurements to provide a final estimation of the parameter ($\hat{x}$).

14 Claims, 4 Drawing Sheets

(56) References Cited

OTHER PUBLICATIONS

French Search Report for Application No. 1451290 dated Oct. 27, 2014.

* cited by examiner

METHOD OF SENSOR DATA FUSION

CROSS-REFERENCE TO RELATED APPLICATION

This application claims priority to FR 14 51290 filed Feb. 18, 2014, the entire disclosure of which is incorporated by reference herein.

TECHNICAL FIELD

The disclosure herein relates to the field of the merging of measurements from sensors, more particularly to estimate a flight parameter of an aircraft.

BACKGROUND

An aircraft is equipped with a large number of sensors making it possible to measure its flight parameters (speed, attitude, position, altitude, etc.), and more generally its state at each instant.

These flight parameters are then used by avionics systems, notably the automatic pilot system, the flight computers (Flight Control Computer Systems), the aircraft control and guidance system (Flight Guidance System), systems that are among the most critical of the aircraft.

Because of the critical nature of these systems, the sensors are redundant, i.e. a plurality of sensors supply measurements of one and the same parameter. These different measurements are then processed by a measurements merging method in order to provide the fairest possible estimation of the parameter. The estimation of the parameter is, for example, an average value, or a median value of a plurality of measurements each supplied by a distinct sensor. The estimation of the parameter is also called "consolidated value", or "estimated value".

In order to improve the estimation of the parameter, the measurements merging methods generally comprise a searching for a possible anomaly on one of the sensors, in order not to take into account an aberrant measurement supplied by a sensor exhibiting an anomaly.

For example, a measurements merging method is known that comprises, at each instant, the following steps:
- calculation of the median value of the measurements supplied by the different sensors;
- positioning of the measurements supplied by the sensors in relation to a tolerance band of predetermined width, centered on the median value;
- elimination of the measurements situated outside of this tolerance band;
- estimation of the value of the parameter from the remaining measurements.

The step of positioning the measurements in relation to a tolerance band implements a searching for a possible anomaly on one of the sensors, this anomaly being revealed by the supply of an aberrant measurement.

One drawback with such a measurements merging method is that it does not make it possible to reliably determine a probability of false alarm, that is to say the probability of considering that a sensor is exhibiting an anomaly, although it is not exhibiting any such anomaly.

SUMMARY

One objective of the disclosure herein is to propose a method for merging sensor measurements, more particularly for estimating a flight parameter of an aircraft, which makes it possible to reliably determine a probability of false alarm.

This objective is achieved with a method for merging measurements of a parameter, in particular a flight parameter of an aircraft, from measurements of this parameter supplied respectively by a plurality of sensors.

The method according to the disclosure herein comprises:
1) searching for a possible anomaly on one out of at least two sensors, called sensors of interest, comprising the following substeps:
   1a) for each sensor of interest, computing a so-called detection deviation, proportional to the absolute value of a difference between a measurement supplied by this sensor of interest, and an estimation of the parameter computed from the measurements supplied by the other sensors of interest;
   1b) comparing each detection deviation to a corresponding predetermined threshold;
   1c) based on the result of the comparisons, determining the presence or the absence of an anomaly on one of the sensors of interest with a determined total probability of false alarm; and
2) merging measurements supplied by the sensors of interest, to provide an estimation of the parameter, called final estimation.

Each sensor of interest is associated with a normal law characteristic of the total error on the measurement that it supplies, in the absence of anomaly. This normal law is denoted $\mathcal{N}(\mu_i; \sigma_i)$, in which $\sigma_i$ is a standard deviation, and $\mu_i$ is an average.

$y_i$ denotes the measurement supplied by the sensor of interest i, and $\widehat{x_{-i}}$ denotes an estimation of the parameter computed from the measurements supplied by the other sensors of interest, that is to say by excluding the sensor of interest i.

The detection deviation relating to the sensor of interest i is denoted $T_i$ and, according to the disclosure herein, the following applies:

$$T_i \propto |y_i - \widehat{x_{-i}}| \quad (1)$$

If x is the real value of the parameter, then, when all the sensors of interest are operating correctly:

$$V3_i = y_i - \widehat{x_{-i}} = (y_i - x) + (x - \widehat{x_{-i}}) = V1_i + V2_i \quad (2)$$

$V1_i = (y_i - x)$ is the difference between the measurement supplied by the sensor of interest i and the real value of the parameter. This is the error on the measurement supplied by the sensor of interest i. It is therefore a random variable that is defined, in the absence of anomaly on the sensor of interest i, by a normal law of average $\mu_i$, of standard deviation $\sigma_i$ and of variance $\sigma_i^2$, denoted $\mathcal{N}(\mu_i; \sigma_i)$. This normal law is determined from the characterization of the errors of each sensor i.

$V2_i = (x - \widehat{x_{-i}})$ is the difference between the estimation obtained from the measurements supplied by the sensors of interest other than the sensor i and the real value of the parameter. It is the error on the estimation obtained from the measurements supplied by the sensors of interest other than the sensor i. It is therefore a random variable that is defined, in the absence of anomaly on these sensors of interest, by a normal law of average $\mu_{-i}$, of variance $\sigma_{-i}^2$, denoted $\mathcal{N}(\mu_{-i}; \sigma_{-i})$. This normal law is determined from the characterization of the errors of each sensor i.

The variance $\sigma_{-i}^2$ depends on the values of the different $\sigma_j^2$, $j \neq i$, and on the method of computing $\widehat{x_{-i}}$. The average $\mu_{-i}$ depends on the values of the different $\mu_j$, $j \neq i$, and on the method of computing $\widehat{x_{-i}}$.

For each sensor, the normal law characteristic of the total error on the measurement that it supplies is advantageously adjusted to a centered normal law, in order to do away with computing the average $\mu_{-i}$.

The variables $V1_i$ and $V2_i$ are independent random variables, because $V1_i$ is computed only from the measurement supplied by the sensor of interest i, and $V2_i$ is computed from the measurements supplied by all the other sensors of interest j≠i. Their covariance is zero, such that, in the absence of anomaly on the sensors of interest, the variable $V3_i = V1_i + V2_i$ is defined by a normal law whose variance is equal to $\sigma_i^2 + \sigma_{-i}^2$. This variance is denoted $\sigma_{Ti}^2$. It is in fact because $V1_i$ and $V2_2$ are independent random variables that the variance of $V3_i$ is equal to the sum of the variances of $V1_i$ and $V2_i$.

The fact that the random variables $V1_i$ and $V2_2$ are independent also means that the random variable $V3_i$ is defined by a normal law of average $\mu_{Ti}$ equal to the sum of the averages $\mu_i$ and $\mu_{-i}$.

The variable $V3_i$ can therefore be defined, in the absence of anomaly on the sensors of interest, by a normal law whose variance is equal to $\sigma_{Ti}^2 = \sigma_i^2 + \sigma_{-i}^2$, and whose average is equal to $\mu_{Ti} = \mu_i + \mu_{-i}$, denoted $\mathcal{N}(\mu_{Ti}; \sigma_{Ti})$.

From this normal law, it is possible to deduce therefrom the value of a predetermined threshold associated with the detection deviation $T_i$ distinguishing the case in which one of the sensors of interest exhibits an anomaly, from the case in which none of the sensors of interest exhibits an anomaly. This threshold is associated with the probability of false alarm denoted $P_{FAi}$, which corresponds to the probability of considering, from the comparison between the detection deviation $T_i$ and a threshold $T_{di}$, that a sensor of interest is exhibiting an anomaly although it is not exhibiting such an anomaly.

The probability of false alarm $P_{FAi}$ is linked to the detection deviation $T_i$, but not necessarily to the sensor i itself. It can be another sensor which is exhibiting the anomaly.

Hereinbelow, the example in which $T_i = |y_i - \widehat{x_{-i}}| = |V3_i|$ is detailed. A person skilled in the art will easily be able to adapt this example as a function of the proportionality factor between $|V3_i|$ and $T_i$ (see equation (1)).

It is assumed that only one of the sensors can exhibit an anomaly, at an instant t.

The following notations are used:

$H_0$ is the assumption according to which all the sensors of interest are operating correctly;

$H_1$ is the assumption according to which one of the sensors of interest is exhibiting an anomaly; and $T_{di}$ is the value of the predetermined threshold (linked to the detection deviation $T_i$), such that $T_i \geq T_{di}$ implies that the assumption $H_1$ is accepted (and the assumption $H_0$ is rejected).

It can be noted that it is unimportant to know which deviation $T_i$ has exceeded the detection threshold $T_{di}$, because this does not make it possible to deduce therefrom that it is the sensor of interest i which is exhibiting an anomaly. A plurality of assumptions $H_{1i}$, which would each be linked to a deviation $T_i$, are not therefore distinguished.

The probability of false alarm then corresponds to the probability of rejecting the assumption $H_0$ when the assumption $H_0$ is true. This probability of false alarm can be expressed from the detection deviation $T_i$:

$$P_{FAi} = P(T_i \geq T_{di} | T_i \sim \mathcal{N}(\mu_{Ti}; \sigma_{Ti}));$$

$P_{FAi} = \int_{T_{di}}^{+\infty} f\mathcal{N}_{(\mu_{Ti}; \sigma_{Ti})}(t)dt$, in which $f\mathcal{N}_{(\mu_{Ti}; \sigma_{Ti})}$ is the probability density corresponding to the law $\mathcal{N}(\mu_{Ti}; \sigma_{Ti})$;

$P_{FAi} = 1 - F\mathcal{N}_{(\mu_{Ti}; \sigma_{Ti})}(T_{di})$, in which $F\mathcal{N}_{(\mu_{Ti}; \sigma_{Ti})}$ is the distribution function of the law $\mathcal{N}(\mu_{Ti}; \sigma_{Ti})$.

Such that the decision threshold $T_{di}$ is defined by:

$$T_{di} = F\mathcal{N}_{(\mu_{Ti}; \sigma_{Ti})}^{-1}(1 - P_{FAi}) \qquad (3)$$

In other words, a desired value is set for the probability of false alarm $P_{FAi}$, then the value of a predetermined threshold for the detection deviation $T_{di}$ is deduced, separating the case in which all the sensors of interest are operating correctly from the case in which one of the sensors of interest is exhibiting an anomaly.

The other decision thresholds $T_{dj}$, each corresponding to a detection deviation $T_j$ relating to the sensor of interest j≠i, can be defined in the same way.

Each decision threshold $T_{dj}$ is then defined from a probability of false alarm $P_{FAj}$ which corresponds to the probability of considering, from the comparison of the detection deviation $T_j$ with a threshold $T_{dj}$, that a sensor of interest is exhibiting an anomaly when it is not exhibiting any such anomaly.

In practice, each detection deviation is tested by comparing it to its corresponding decision threshold. If at least one of these tests shows that one of the sensors of interest is exhibiting an anomaly, it is deduced therefrom that the assumption $H_1$ is true.

The total probability of false alarm, denoted $P_{FA}$, is the sum of the probabilities of false alarm associated with each of the detection deviations:

$$P_{FA} = \sum_{i=1}^{M} P_{FAi}, \text{ M being the number of sensors of interest} \qquad (4)$$

It can therefore be seen that, by virtue of the use of a decision criterion defined by independent random variables $y_i$ and $\widehat{x_{-i}}$, it is possible to know the total probability of false alarm associated with the diagnosis according to which all the sensors of interest are operating normally or according to which one of the sensors of interest is exhibiting an anomaly. A measurements merging method is therefore proposed that offers a rigorous characterization of a final estimation of a parameter.

The detailed explanation of particular embodiments provides additional details concerning the implementation of the disclosure herein, notably the determination of normal laws characterizing the errors of the sensors, the determination of the variables $V1_i$ and $V2_i$, etc.

According to a first embodiment of the disclosure herein, the method comprises a searching for a possible anomaly on one out of two sensors of interest, and a merging of the measurements supplied by these two sensors of interest, to provide an estimation of the parameter, called final estimation.

According to a second embodiment of the disclosure herein, the searching for a possible anomaly implements a searching for a possible anomaly on one out of at least three sensors of interest, and further comprises the following substep, when the presence of an anomaly is determined on one of the sensors of interest:

1d) identifying the sensor of interest exhibiting an anomaly, the measurements merging step implementing a merging of the measurements supplied by:

the sensors of interest, if the absence of an anomaly on one of the sensors of interest has been determined;

the sensors of interest except for a sensor of interest exhibiting an anomaly, if the presence of an anomaly on this sensor of interest has been determined.

According to this second embodiment of the disclosure herein, the measurements merging step can provide an estimation of the parameter, computed from the measurements of the parameter supplied by:

the sensors of interest, except for a sensor of interest exhibiting an anomaly, if the presence of an anomaly on this sensor of interest has been determined, at each measurement instant during a predetermined time, and;

the sensors of interest, in the other cases.

Preferably, for each sensor of interest, the detection deviation is proportional to the absolute value of a difference, divided by the standard deviation of a centered normal law characterizing, in the absence of anomaly on the sensors of interest, the difference between a measurement supplied by this sensor of interest, and an estimation of the parameter computed from the measurements supplied by the other sensors of interest.

For each detection deviation, the predetermined threshold is advantageously determined from a desired probability of false alarm corresponding to the probability of determining, from this detection deviation, the presence of an anomaly on one of the sensors of interest, although this anomaly does not exist.

The step of identifying the sensor of interest exhibiting an anomaly preferably comprises:

$1d_1$) for each sensor of interest, a computation of an estimation of the parameter, from the measurements of this parameter supplied by the other sensors of interest, the sensor of interest concerned being excluded;

$1d_2$) for each duly computed estimation, a computation of a residual value which depends on the distances between the measurements supplied by the other sensors of interest and the estimation; and $1d_3$) a search for a minimum residual value, the excluded sensor of interest associated with the minimum residual value being the sensor of interest exhibiting an anomaly.

Each of the estimations of the parameter can be a weighted average of measurements each supplied by a sensor of interest.

Each estimation of the parameter can be a weighted average of measurements each supplied by a sensor of interest, each measurement supplied by a sensor of interest being weighted by the inverse of the variance of a normal law characterizing a total measurement error relating to the sensor of interest, in the absence of anomaly on this sensor of interest.

The final estimation of the parameter can be a weighted average of measurements each supplied by a sensor of interest, each measurement supplied by a sensor of interest being weighted by a coefficient minimizing the value of the maximum error on the final estimation, introduced by an anomaly of a sensor of interest used to compute the final estimation.

The method according to the disclosure herein advantageously comprises a new step of searching for a possible anomaly, by considering the sensors of interest taken into account to provide the final estimation as new sensors of interest.

As a variant, the method according to the disclosure herein can comprise a new step of searching for a possible anomaly, by considering the sensors of interest taken into account to provide the final estimation, and at least one sensor of interest previously identified as exhibiting an anomaly, as new sensors of interest.

Preferably, the method according to the disclosure herein comprises a computation of an error of accuracy of the final estimation, comprising the following steps:

a normal law is determined that characterizes a total measurement error associated with the final estimation, in the absence of anomaly on the sensors of interest taken into account for the final estimation;

a value is set for a probability that the absolute value of the total measurement error associated with the final estimation is greater than a threshold to be determined;

the value of the threshold, called error of accuracy of the final estimation, is deduced therefrom.

The method according to the disclosure herein can comprise the following steps, for each sensor of interest:

a probability of wrong detection is set, that is common to all the sensors of interest, corresponding to the probability of determining the absence of an anomaly on one of the sensors of interest, although this anomaly exists on the sensor of interest concerned; and the value of the minimum detectable bias is deduced therefrom, corresponding to the smallest bias introduced by an anomaly of the sensor of interest, on the measurement that it supplies, and that makes it possible to determine the presence of an anomaly on one of the sensors of interest, with the probability of wrong detection as set.

A computation of an error of integrity of the final estimation can then comprise the following steps:

for each sensor of interest used to compute the final estimation, computing an indicator proportional to the error introduced on the final estimation, by a failure of the sensor of interest, this failure being characterized by a bias corresponding to the minimum detectable bias;

determining the greatest indicator, called error of integrity of the final estimation.

BRIEF DESCRIPTION OF THE DRAWINGS

The disclosure herein will be better understood on reading the description of exemplary embodiments given for purely illustrative purposes and in a nonlimiting manner, with reference to the attached drawings in which.

DETAILED DESCRIPTION

The estimation of a parameter, by a plurality of measurements of this parameter, obtained by different sensors, will be considered hereinbelow.

The disclosure herein applies more particularly to the estimation of a flight parameter of an aircraft, for example its speed, its attitude, its acceleration, its angular rotation speed, its angle of trajectory, its heading angle or even its position. It can also be a temperature or a pressure inside the aircraft or in the vicinity thereof. The disclosure herein is not, however, limited to such an application, but can on the contrary be applied to numerous technical fields in which measurements from a plurality of sensors have to be merged.

A "sensor" should be understood here to mean a physical sensor capable of directly measuring the parameter concerned but also a system that can comprise one or more physical sensor(s) as well as signal processing making it possible to provide an estimation of the parameter from the measurements supplied by these physical sensors. Similarly, "measurement of this parameter" will describe a raw measurement from a physical sensor or a measurement obtained by a more or less complex signal processing of raw measurements.

Each sensor is, for example, an IRS ("Inertial Reference System") inertial sensor, an AHRS ("Attitude & Heading Reference System") inertial sensor, a satellite (GNSS, GPS or Galileo for example) positioning sensor, a conventional ADR ("Air Data Reference") anemometric sensor, an ADR LIDAR laser anemometric sensor, a tachometer-type angular sensor, an angular sensor based on a tachometer or an odometer, an optical sensor (camera), a conventional RA ("Radio Altimeter") height sensor, an RA LIDAR laser height sensor, a radio positioning sensor (for example of VOR, DME, ADF, Radio Nav type), a radio landing sensor (for example ILS or MLS), a satellite landing sensor (SLS, GLS for example).

Figure 1:
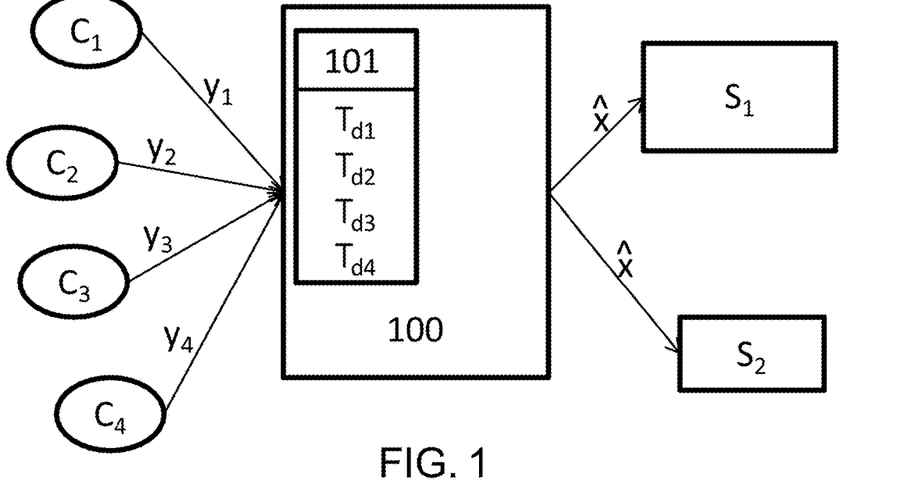
FIG. 1 schematically illustrates the context of application of the disclosure herein.

FIG. 1 shows the context of application of the disclosure herein with the notations which will be used hereinbelow.

The parameter to be estimated is x(t), denoted x in order to simplify the notations.

At each instant, the sensors $C_1$, $C_2$, $C_3$, $C_4$ respectively acquire the measurements $y_1(t)$, $y_2(t)$, $y_3(t)$, and $y_4(t)$ of the parameter x. They then supply these measurements to a data merging module 100.

In order to simplify the notations, hereinbelow these measurements will be denoted simply $y_1$, $y_2$, $y_3$ and $y_4$.

The sensors can be of the same type or of different types. At least two sensors are provided. Nevertheless, advantageously, three or more sensors will be preferred.

Hereinbelow, and in a nonlimiting manner, the example of four sensors will be taken: two IRS sensors $C_1$, $C_2$, and two AHRS sensors $C_3$, $C_4$. The parameter x corresponds here to the attitude angles which are the roll and pitch angles.

The data merging module 100 receives as input the measurements $y_1$, $y_2$, $y_3$ and $y_4$. The data merging module comprises a memory 101 receiving predetermined thresholds $T_{d1}$, $T_{d2}$, $T_{d3}$, $T_{d4}$, respectively associated with the sensor $C_1$, $C_2$, $C_3$, $C_4$. From the measurements $y_1$, $y_2$, $y_3$ and $y_4$ and the predetermined thresholds $T_{d1}$, $T_{d2}$, $T_{d3}$, $T_{d4}$, the data merging module provides an estimation $\widehat{x(t)}$ of the parameter x, simply denoted $\hat{x}$. The estimation of the parameter x provided at the output of the merging module will hereinbelow be called "final estimation".

The method according to the disclosure herein is implemented by a data merging module 100 comprising electronics and computing and/or software. The data merging module comprises, for example, a microcontroller.

The method according to the disclosure herein is implemented, more generally, in an assembly comprising sensors $C_1$, $C_2$, $C_3$, $C_4$ and the data merging module 100 in data communication with the sensors.

The data merging module 100 is generally in communication with at least one system, here two avionics systems $S_1$ and $S_2$, to transmit to them, at each instant, the final estimation $\hat{x}$. The avionics systems are, for example, a navigation system, an automatic pilot system, a system collecting data to be transmitted to the pilot, an engine control system, a flight control system, etc.

Prior to the implementation of the method according to the disclosure herein, a calibration step will be able to be implemented for the purpose of determining, for each sensor, a normal law characteristic of a total error on the measurement supplied by this sensor, when it is operating normally. This normal law is determined from the characterization of the errors of the sensor.

In order to simplify the computations, they will preferably be reduced to centered normal laws. It is still possible to characterize a sensor by a centered normal law. For example, if a sensor exhibits a measurement bias, this bias simply has to be subtracted to get back to a centered law.

Figure 2:
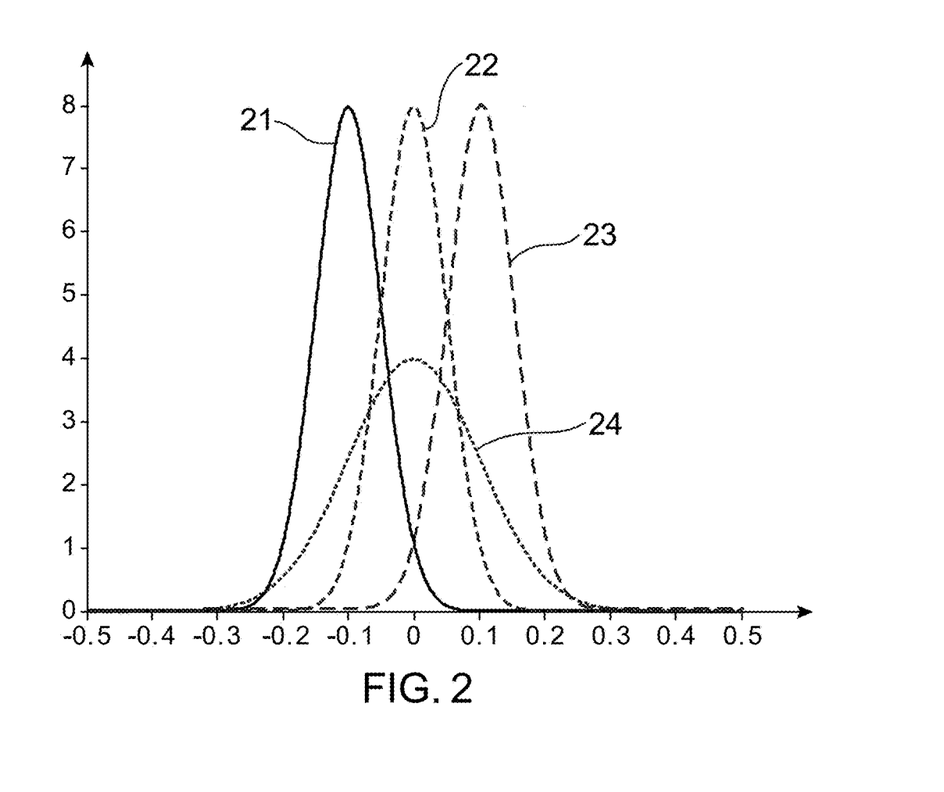
FIG. 2 illustrates an example of determination of a normal law characteristic of the error on a measurement supplied by a sensor.

FIG. 2 illustrates an example of determination of such a centered normal law.

In the context of normal operation of a sensor $C_i$, the following is posited:

$$y_i = x + e_i \quad (5)$$

in which $y_i$ is the measurement by the sensor $C_i$, x is the real value of the parameter, and $e_i$ is the total measurement error by the sensor $C_i$.

It is assumed, for example, that the error $e_i$ comprises a measurement error specific to the sensor $e_{mes\_i}$, and an error of installation of the sensor relative to the reference frame of the aircraft $e_{ins\_i}$. Depending on the cases, it will be possible to envisage other sources of error, for example an aerodynamic error in the case of an anemometric sensor.

The error $e_{mes\_i}$ is defined by a normal law, also called Gaussian law, of average $\mu_{mes\_i}$ and of standard deviation $\sigma_{mes\_i}$ law. This normal law is denoted $\mathcal{N}(\mu_{mes\_i}; \sigma_{mes\_i})$ The value of the standard deviation $\sigma_{mes\_i}$ is known (for example 0.05° for an IRS sensor, and 0.5° for an AHRS sensor), and the interval bounding the values of $\mu_{mes\_i}$ (for example [−0.05°; 0.05°] for an IRS sensor, and [−0.5; 0.5°] for an AHRS sensor).

The error $e_{ins\_i}$ is defined by a simple bias denoted $\mu_{ins\_i}$. This error is due to the imperfections of installation of the sensor and to other phenomena such as the deformation of the fuselage in the flight phases. For example, $\mu_{ins\_i} \in$ [−0.05°; 0.05°] applies for an IRS sensor and for an AHRS sensor.

The total error $e_i$ is therefore defined by a normal law of standard deviation $\sigma_{mes\_i}$ and of average $\mu_{mes\_T} = \mu_{mes\_i} + \mu_{ins\_i}$. The average of the total error $e_i$ is therefore bounded by the interval [−0.1°; 0.1°] for an IRS sensor and [−0.55; 0.55°] for an AHRS sensor.

In order for an algorithm corresponding to the method according to the disclosure herein to remain valid regardless of the real distribution of the total measurement error, a conservative assumption is made. In other words, a centered normal law is determined which provides a trade-off between the different centered normal laws corresponding to the possible different values of the average $\mu_{mes\_i} + \mu_{ins\_i}$. An upper bound of the total measurement error is therefore sought.

This trade-off is represented in FIG. 2.

The curve 21 represents the normal law of standard deviation $\sigma_{mes\_i}$ and of average min ($\mu_{mes\_T}$), the minimum value of the average $\mu_{mes\_T}$.

The curve 22 represents the normal law of standard deviation $\sigma_{mes\_i}$ and of average average($\mu mes_{\_T}$)) the average value of the average $\mu_{mes\_T}$.

The curve 23 represents the normal law of standard deviation $\sigma_{mes\_i}$ and of average max($\mu_{mes\_T}$), the maximum value of the average $\mu_{mes\_T}$.

The curve 24 represents the normal law of standard deviation $\sigma_i$ and of average $\mu_i=0$, encompassing the curves 21, 22 and 23. It is therefore a centered normal law, denoted $\mathcal{N}$ (0; $\sigma_i$), the standard deviation of which is defined in such a way as to obtain a centered normal law which provides a trade-off between the different normal laws corresponding to the possible different values of the average $\mu_{mes\_i}+\mu_{ins\_i}$. For example $\sigma_i=0.1°$ applies for an IRS sensor and $\sigma_i=0.8°$ applies for an AHRS sensor.

The values of $\sigma_i$ (0.1° and 0.8°) are determined here theoretically and more particularly graphically, from FIG. 2.

For this, a Gaussian curve (referenced 24) is plotted in such a way that it is always above the two extreme Gaussian curves (referenced 21 and 23) from a certain error value (approximately 2° for AHRS and approximately 0.2° for IRS), and consequently from a certain probability value.

Other theoretical methods could be used, for example a method for real-time estimation of the errors based, for example, on a Kalman filter.

The values of $\sigma_i$ can also be determined practically, for example by in-flight tests.

The values 0.1° and 0.8° for $\sigma_i$ are used as an example. These values are, however, realistic, given the type of sensor concerned (IRS or AHRS) and the installations in an aircraft.

Figure 3:
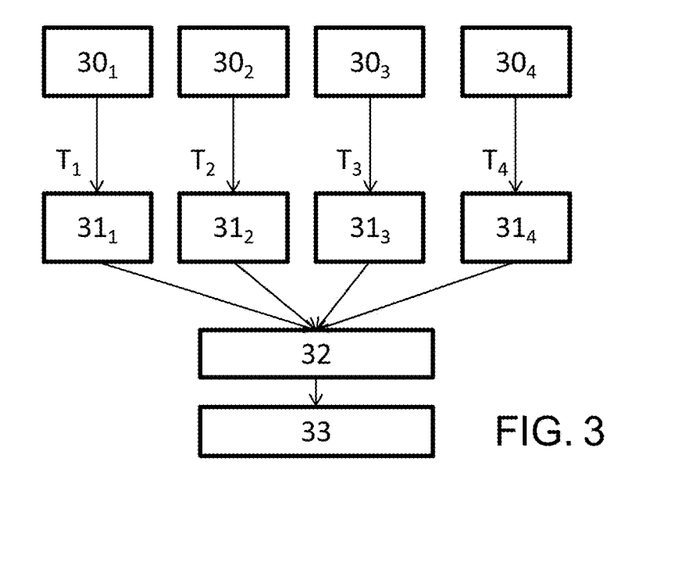
FIG. 3 schematically illustrates a method for merging measurements according to one embodiment of the disclosure herein.

FIG. 3 schematically illustrates a measurements merging method according to one embodiment of the disclosure herein.

A preliminary step of acquisition of measurements of the parameter by the sensors is assumed.

From the sensors $C_1$, $C_2$, $C_3$, $C_4$, sensors called sensors of interest are selected, out of which a possible failing sensor will be sought (that is to say one exhibiting an anomaly). At least three sensors of interest are selected.

It is, for example, initially assumed that all the sensors $C_1$, $C_2$, $C_3$, $C_4$ are operating normally although one of them could be made to exhibit an anomaly. The sensors of interest are then the four sensors $C_1$, $C_2$, $C_3$, $C_4$.

For each sensor $C_1$, $C_2$, $C_3$, $C_4$, the value of a detection deviation $T_1$, $T_2$, $T_3$, respectively $T_4$ (step $30_1$, $30_2$, $30_3$, respectively $30_4$) is computed.

The detection deviation $T_i$ is proportional to the absolute value of the difference between the measurement supplied by the sensor i and an estimation of the parameter, computed from the measurements supplied by the other sensors of interest (see formula (1)). This difference is called useful difference.

In the example detailed here, the detection deviation $T_i$ is equal to the useful difference divided by the standard deviation of a normal law characterizing this useful difference in the absence of anomaly on the sensors of interest:

$$T_i = \frac{|y_i - \hat{x}_{-1}|}{\sigma_{Ti}} \quad (6)$$

As detailed previously, the variable $V3_i = y_i - \hat{x}_{-1}$ is defined, in the absence of anomaly on the sensors of interest, by a normal law whose variance is equal to $\sigma_{Ti}^2 = \sigma_i^2 + \sigma_{-i}^2$. The variable $V3_i$ corresponds to a centered normal law, which can be determined from the variances associated with the total measurement errors associated with each of the sensors of interest.

It will be considered that the total measurement errors on the sensors are each characterized by a centered normal law, such that $V3_i$ is defined, in the absence of anomaly on the sensors of interest, by a centered normal law.

The denominator $\sigma_{Ti}$ makes it possible for the detection deviation $T_i$ to be finally defined, for each sensor of interest i, by one and the same reduced centered normal law, of variance equal to unity, denoted $\mathcal{N}$ (0; 1).

Thus, the detection deviation as defined in the equation (6) is particularly advantageous because it makes it possible for all the detection deviations $T_i$ to be defined by one and the same centered normal law, i.e. a reduced centered normal law.

Then, each detection deviation $T_1$, $T_2$, $T_3$, respectively $T_4$, is compared to a corresponding predetermined threshold $T_{d1}$, $T_{d2}$, $T_{d3}$, respectively $T_{d4}$ (step $31_1$, $31_2$, $31_3$, respectively $31_4$).

During a step 32, the presence or not of an anomaly on one of the sensors of interest is determined, based on the results of the comparisons. In particular, if there is at least one detection deviation $T_1$, $T_2$, $T_3$, respectively $T_4$, which is greater than or equal to $T_{d1}$, $T_{d2}$, $T_{d3}$, respectively $T_{d4}$, it is deduced therefrom that one of the sensors of interest is exhibiting an anomaly. The disclosure herein therefore at this stage produces a detection of failure or of disturbance affecting one of the sensors of interest.

The steps $30_i$, $31_i$ and 32 therefore together form a step of searching for a possible anomaly on one of the sensors of interest.

It can be noted that if $T_i \geq T_{di}$, this does not necessarily mean that it is the sensor of interest i which has failed, because the value of $T_i$ depends on $y_i$, but also on $\hat{x}_{-i}$ which is determined by the measurements supplied by the sensors of interest other than the sensor of interest i. Steps that make it possible to identify the sensor of interest exhibiting an anomaly are presented below.

As presented previously, when the detection deviation is defined by a normal law $\mathcal{N}$ ($\mu_{Ti}$; $\sigma_{Ti}$), the corresponding predetermined threshold is $T_{di}=F_{\mathcal{N}\,(\mu_{Ti};\,\sigma_{Ti})}^{-}(1-P_{FAi})$ (see equation (3)).

In the example presented here, each detection deviation is defined by the reduced centered normal law $\mathcal{N}$ (0; 1). Thus, for each detection deviation, the predetermined threshold is $T_{di}=F_{\mathcal{N}\,(0;\,1)}^{-}(1-P_{FAi})$. Preferably, a desired probability of false alarm $P_{FAi}$ is set that is identical for all the detection deviations each associated with a sensor i.

Thus, the predetermined threshold $T_{di}$ is the same, for each detection deviation associated with a sensor i. The definition of the detection deviation as given in the equation (6) is therefore particularly advantageous, since it makes it possible to consider a single predetermined threshold $T_d$ for all the detection deviations $T_i$ according to the disclosure herein. The method is greatly simplified. If Ti≥Td, then this means that the assumption $H_1$ as presented in the introduction, that is to say that one of the sensors of interest is exhibiting an anomaly (not necessarily the sensor i), is accepted.

It is assumed that the determination of the predetermined thresholds $T_{di}$ has been performed prior to the implementation of the method according to the disclosure herein. However, it will be possible to provide for the method according to the disclosure herein to include this step of determining the predetermined threshold, for each detection deviation. In this case, the following can be supplied to the merging module 100:

the desired probability of false alarm, associated with each detection deviation; and the centered normal laws characterizing each detection deviation, when none of the sensors of interest is exhibiting an anomaly.

All the estimations implemented according to the disclosure herein are advantageously weighted averages. Each sensor has an associated specific weighting coefficient.

The so-called intermediate estimations $\hat{x}_{-1}$ are preferably weighted averages such that the weighting coefficient associated with a measurement by a sensor of interest is equal to the inverse of the variance of the normal law characterizing a total measurement error relating to this sensor of interest in the absence of anomaly on this sensor of interest. This estimation is called "least squares method".

The estimation of x from the measurements supplied by the sensors of interest, except for the sensor of interest i, is then defined as follows:

$$\hat{x}_{-1} = \frac{\sum_{\substack{j=1 \\ j \neq i}}^{M} w_j y_j}{\sum_{\substack{j=1 \\ j \neq i}}^{M} w_j} \quad (7)$$

M is the number of sensors of interest, and $$w_j = \frac{1}{\sigma_j^2}$$

(inverse of the variance).

In other words, the aim is to minimize the following criterion:

$$\hat{x}_{-i} = \operatorname{argmin}(X_i^2(x))$$

in which $$X_i^2(x) = \sum_{\substack{j=1 \\ j \neq i}}^{M} \frac{(y_i - x)^2}{\sigma_i^2},$$

which is tantamount to resolving $\overrightarrow{\operatorname{grad}} X_i^2(x) = \vec{0}$.

If necessary, the value of $\sigma_{-i}$ can be determined. For example, in the case of an estimation by the least squares method, the following applies:

$$\frac{1}{\sigma_{-i}^2} = \sum_{\substack{j=1 \\ j \neq i}}^{M} \frac{1}{\sigma_j^2}.$$

The least squares method, that is to say a weighted average whose coefficients are equal to the inverses of the variances, is a method known to be optimal for minimizing the difference between a measurement and the estimation of the measurement, since it minimizes mean square error. The least squares method therefore provides the most accurate possible estimation.

The method according to the disclosure herein then comprises a measurements merging step 33. The step 33 corresponds to a computation of the estimation $\hat{x}$ of the parameter x, called "final estimation".

In the example illustrated with reference to the figures, there are four sensors of interest.

If, at the end of the step 32, it has been concluded that none of the sensors of interest is exhibiting an anomaly, the final estimation $\hat{x}$ takes into account the measurements supplied by all the sensors of interest.

If, at the end of the step 32, it has been concluded that one of the sensors of interest is exhibiting an anomaly, and then this sensor has been identified as being the sensor i, the final estimation $\hat{x}$ takes into account the measurements supplied by all the sensors of interest except for the sensor i. It can be considered that there has been an exclusion of the sensor of interest exhibiting an anomaly, in order for the measurements that it supplies not to be taken into account for the computation of the final estimation. The tolerance of the systems, notably avionic systems, to the failures and disturbances of the sensors is thus enhanced, since the systems receive a final estimation that is free of the effect of these failures and disturbances.

In the case (not represented) where there are only two sensors of interest, the final estimation $\hat{x}$ takes into account the measurements supplied by all the sensors, even if it has been determined that one of the sensors is exhibiting an anomaly.

The final estimation is therefore, at each instant, "the fairest possible estimation", by virtue of the exclusion in real time of a sensor identified as exhibiting an anomaly.

Advantageously, at a given instant t, and after having excluded a failing sensor, no effort is made to exclude a second. The exclusion of a possible second failing sensor will then take place at the instant t+1. In practice, the probability for two sensors to be failing exactly at the same instant t is almost zero. The assumption according to which, at each instant t, there is at most one failing sensor, is therefore credible. This assumption includes the case where the failure of the two sensors is very slightly staggered in time, for example one sensor is failing at the instant t and the other sensor is failing at the instant t+1.

The final estimation is preferably an estimation by the least squares method:

$$\hat{x} = \frac{\sum_{j=1}^{M} w_j y_j}{\sum_{j=1}^{M} w_j}.$$

As specified above, the least squares method provides the optimal degree of accuracy. If appropriate, it will be possible to implement other types of weighted averages implementing other coefficients, denoted $w'_j$, to replace $$w_j = \frac{1}{\sigma_j^2}.$$

It will, for example, be possible to improve an integrity of the final estimation (to the detriment of its accuracy). The values of the coefficients $w'_j$, will have to be determined by justifying their validity. One example of such a determination is detailed hereinbelow (new coefficients $w'_I$, $w'_A$).

Thus, the estimations other than the final estimation will preferably be estimations by the least squares method, whereas the final estimation will be able to be a weighted average whose weighting coefficients are set to prioritise a criterion other than maximum accuracy.

The measurements merging method according to the disclosure herein is a centralised merging, in which the different measurements are processed in a centralised manner (unlike a cascaded merging in which some data are pre-processed).

The measurements merging method according to the disclosure herein is also an instantaneous merging, in which each computation takes into account only measurements at one and the same instant t (unlike a recursive merging).

The computations implemented are simple, therefore quick to execute and consume little in terms of computation resources.

Figure 4:
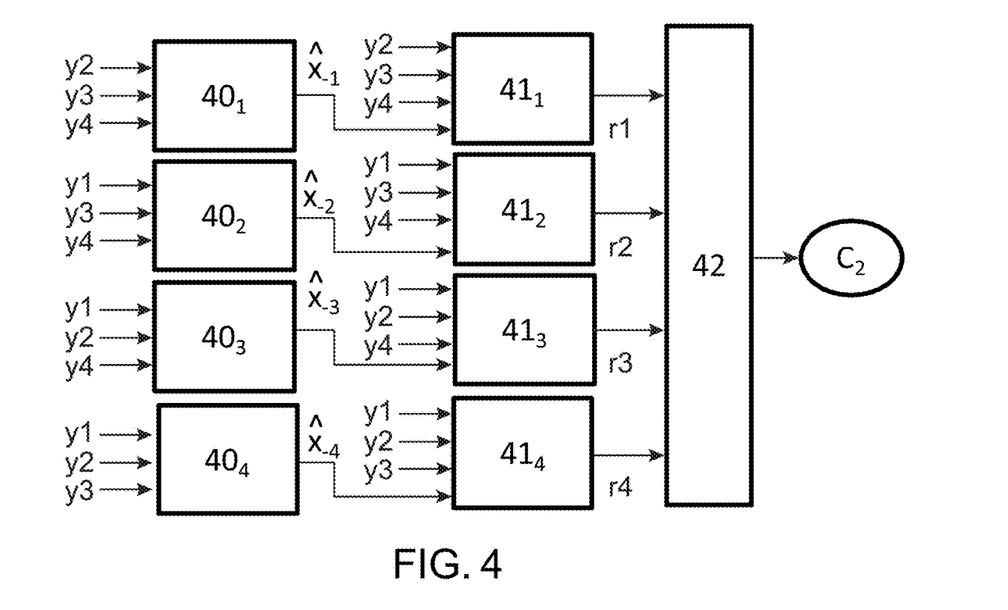
FIG. 4 schematically illustrates a method according to one embodiment of the disclosure herein, making it possible to identify a sensor of interest exhibiting an anomaly.

FIG. 4 schematically illustrates steps of a method according to one embodiment of the disclosure herein, making it possible to identify the sensor of interest exhibiting an anomaly, when the presence of an anomaly on one of the sensors of interest has been determined.

For each sensor of interest, an estimation $\hat{x_{-1}}$, $\hat{x_{-2}}$, $\hat{x_{-3}}$, respectively $\hat{x_{-4}}$, is computed from the measurements of the parameter supplied by the other sensors of interest $\{y_2, y_3, y_4\}$, $\{y_1, y_3, y_4\}$, $\{y_1, y_2, y_4\}$, respectively $\{y_1, y_2, y_3\}$. These are the steps referenced $40_1$, $40_2$, $40_3$, respectively $40_4$.

Each estimation is, for example, computed by the least squares method $$\hat{x_{-1}} = \frac{\sum_{\substack{j=1 \\ j \neq i}}^{M} w_j y_j}{\sum_{\substack{j=1 \\ j \neq i}}^{M} w_j}.$$

As specified above, the least squares method offers the advantage of providing the optimal degree of accuracy.

For each duly computed estimation, a residual value $r_1$, $r_2$, $r_3$, respectively $r_4$, is computed, which depends on the distances between the estimation and each measurement supplied by the other sensors of interest.

A distance here describes a positive difference between two values. The residual value depends notably:
- on the absolute value of the difference between the estimation and each measurement supplied by the other sensors of interest; or
- on the square of the difference between the estimation and each measurement supplied by the other sensors of interest.

In FIG. 4, the residual values $r_i$ are denoted ri, and the measurements $y_i$ are denoted yi.

The residual value is, for example, a root-mean-square deviation between the estimation and the measurements supplied by the other sensors of interest. For example, the following applies:

$$r_i = \sum_{\substack{j=1 \\ j \neq i}}^{M} \frac{(y_j - \hat{x_{-1}})^2}{\sigma_j^2} = \sum_{\substack{j=1 \\ j \neq i}}^{M} w_j (y_j - \hat{x_{-1}})^2 \tag{8}$$

This concerns the steps referenced $41_1$, $41_2$, $41_3$, respectively $41_4$.

This residual value, based on estimations by the least squares method and on a computation of root-mean-square deviation divided by the variances $\sigma_j^2$, is an optimal method for minimizing the probability of being mistaken in excluding the sensor affected by an anomaly.

If appropriate, other computations of residual values will be able to be implemented, implementing other weighting coefficients.

The smallest residual value as an absolute value (step 42) is then sought. If $r_i$ is the residual value associated with the sensor of interest i, the sensor of interest exhibiting an anomaly is the sensor of interest associated with this smallest residual value.

In the example represented in FIG. 4, $r_2$ is the smallest residual value, therefore $C_2$ is the sensor of interest which is exhibiting an anomaly (sensor associated with the estimation $\hat{x_{-2}}$, which is itself associated with the sensor of interest $C_2$).

The disclosure herein therefore offers automatically detecting and identifying a failure affecting a sensor.

Figure 5:
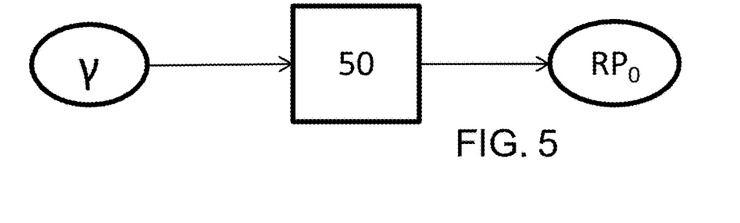
FIG. 5 schematically illustrates a method according to one embodiment of the disclosure herein, making it possible to determine an error of accuracy of an estimation.

FIG. 5 schematically illustrates steps of a method according to the disclosure herein making it possible to determine an error of accuracy of the final estimation, called $RP_0$.

The error of accuracy of the final estimation $\hat{x}$, also called "radius of protection without failure" designates the error on the computation of the final estimation of the parameter, assuming that measurements originating only from sensors not exhibiting anomalies have been taken into account.

The example of a final estimation by the least squares method, that is to say a weighted average whose weighting coefficients are equal to the inverses of the variances, will be taken hereinbelow.

A normal law is determined that characterizes a total measurement error associated with the estimation of the parameter (in the absence of anomaly on the sensors of interest taken into account for the final estimation). Given an estimation by the least squares method, the total measurement error $e_T$ linked to this estimation is defined by:

$$e_T = \frac{\sum_{k=1}^{D} w_k e_k}{\sum_{k=1}^{D} w_k}, \tag{9}$$

D being the number of sensors of interest taken into account to compute $\hat{x}$, $e_k$ the total measurement error linked to the sensor k, and $$w_k = \frac{1}{\sigma_k^2}$$

(in which $\sigma_k$ is the standard deviation of the centered normal law characterizing the total measurement error of the sensor k in the absence of anomaly on the sensor k).

If appropriate, the coefficient $w_k$ is replaced by the weighting coefficient associated with the sensor k and used for the final estimation implemented in the method. Hereinbelow, the determination of new weighting coefficients has been detailed by way of example, in an example in which the three sensors of interest are one IRS and two AHRS.

It is deduced therefrom that $e_T$ follows a centered normal law of standard deviation $\sigma_T$, denoted $\mathcal{N}(0; \sigma_T)$, with $$\frac{1}{\sigma_k^2} = \sum_{k=1}^{D} \frac{1}{\sigma_k^2}.$$

In order to determine this normal law, provision is advantageously made for the memory 101 of the data merging module 100 to contain the different values of $\sigma_i$, for each of the sensors i available.

The value of the desired probability $\gamma$ for the absolute value of the total measurement error $e_T$ to be greater than a threshold $\varepsilon$ to be determined is then set. In other words, $1-\gamma$ is the probability that the error $e_T$ is included in the accuracy range $[-\varepsilon; +\varepsilon]$.

$\gamma=5.10^{-2}$ (error to $2\sigma$), or $\gamma=10^{-3}$ (error to $3\sigma$), or $\gamma=10^{-5}$ (error to $4\sigma$) is, for example, selected.

This condition is formalised thus:

$$P(-\varepsilon \leq e_T \leq +\varepsilon) = 1-\gamma \qquad (10)$$

The value of the threshold $\varepsilon$, which is the error of accuracy of the final estimation $\hat{x}$, also denoted radius of protection without failure $RP_0$, is deduced therefrom (step 50).
The following applies:

$$P(-\varepsilon \leq e_T \leq +\varepsilon) = \int_{-\varepsilon}^{+\varepsilon} f_{\mathcal{N}(0;\sigma_T)}(t) dt, \qquad (11)$$

with $f_{\mathcal{N}(0;\sigma_T)}$ being the probability density of the law $\mathcal{N}(0; \sigma_T)$.
hence:

$$\varepsilon = F_{\mathcal{N}(0;\sigma_T)}^{-1}\left(\frac{1-\gamma}{2} + F_{\mathcal{N}(0;\sigma_T)}(0)\right), \qquad (12)$$

with $F_{\mathcal{N}(0;\sigma_T)}$ being the distribution function associated with the probability density $f_{\mathcal{N}(0;\sigma_T)}$ such that $F_{\mathcal{N}(0;\sigma_T)}(x) = \int_{-\infty}^{x} f_{\mathcal{N}(0;\sigma_T)}(t) dt$.

Figure 6:
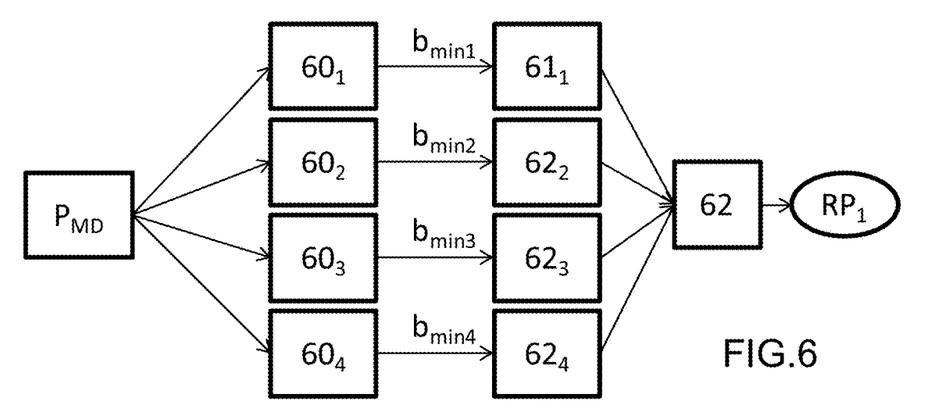
FIG. 6 schematically illustrates a method according to one embodiment of the disclosure herein, making it possible to determine an error of integrity of an estimation.

FIG. 6 schematically illustrates steps of a method according to the disclosure herein, making it possible to determine the error of integrity of the final estimation.

The error of integrity of the final estimation, also called "radius of protection with failure", denotes the error on the computation of the estimation of the parameter, assuming that one of the sensors whose measurement has been taken into account exhibits an anomaly. It is, in particular, the error on the final estimation before a failing sensor has been identified and excluded.

For each detection deviation, a single probability of wrong detection $P_{MD}$ is set.

A wrong detection corresponds to the probability of determining, from comparisons between the detection deviations $T_i$ and the thresholds $T_{di}$, the absence of an anomaly although this anomaly exists on the sensor i=j.

For each sensor of interest j, the smallest bias value $b_{min\,j}$ introduced by an anomaly of the sensor of interest j on the measurement that it supplies, is deduced therefrom, making it possible to detect the presence of an anomaly with the probability of wrong detection as set. These steps are referenced $60_1$, $60_2$, $60_3$, respectively $60_4$, and make it possible to determine the minimum detectable biases $b_{min1}$, $b_{min2}$, $b_{min3}$, respectively $b_{min4}$.

The determination of $b_{min\,j}$ implements a step of determining, for each detection deviation $T_j$, normal law followed by the latter when the sensor of interest j exhibits an anomaly.

At an instant t, an anomaly on the sensor is manifested by a deviation of the measurement relative to an expected measurement. Thus, in the case where the sensor of interest j fails, the failure introduces the bias $b_j$ on the measurement $y_j$:

$$y_j = x + e_j + b_j \qquad (13)$$

In order to simplify the computations, the example, according to which, in the absence of anomaly, each sensor exhibits an error characterized by a centered normal law, is continued.

The variable $V3_j$ as defined above (equation (2)) is the sum of the variable $V1_j$ which then follows a normal law of average $b_j$ denoted $\mathcal{N}(b_j, \sigma_j)$, and of the variable $V2_j$ which always follows the centered normal law $\mathcal{N}(0, \sigma_{-j})$.

Given $$T_j = \frac{|y_j - \hat{x}_{-j}|}{\sigma_{T_j}}$$

($T_j$ as defined in the equation (6)), it is deduced therefrom that $T_j$ then follows a non-centered reduced normal law of average $$\frac{b_j}{\sigma_{T_j}},$$

denoted $$\mathcal{N}\left(\frac{b_j}{\sigma_{T_j}}, 1\right).$$

A person skilled in the art will easily be able to determine the normal law followed by $T_j$ for other definitions of $T_j$ such that $T_j \propto |y_j - \hat{x}_{-j}|$.

As previously, the following notations are used:
$H_0$ is the assumption according to which all of the sensors of interest are operating correctly;
$H_1$ is the assumption according to which one of the sensors of interest is exhibiting an anomaly; and
$T_{di}$ is the value of the predetermined threshold (linked to the detection deviation $T_i$), such that $T_i \geq T_{di}$ implies that the assumption $H_1$ is accepted (and the assumption $H_0$ is rejected).

The probability of wrong detection then corresponds to the probability of rejecting the assumption $H_1$, although the assumption $H_1$ is true.

To compute $b_{min\,j}$, it is considered, in particular, that the probability of wrong detection is linked to $T_j$ and to the sensor j, and corresponds to the probability of rejecting the assumption $H_1$, although the assumption $H_1$ is true and relates to the sensor j. In other words, the probability of verifying $T_i \leq T_{di}$ for any i, although a sensor i=j exhibits an anomaly, that is to say that the corresponding detection deviation is characterized by a normal law $$\mathcal{N}\left(\frac{b_j}{\sigma_{T_j}}, 1\right).$$

In order to simplify the computations, it is assumed that $T_{di} = T_d$, $\forall i$.

$$P_{MD} = P\left[T_i \leq T_d | T_j \sim \mathcal{N}\left(\frac{b_{min\,j}}{\sigma_{T_j}}, 1\right)\right]$$

$$P_{MD} = \int_{-\infty}^{T_d} f_{\mathcal{N}\left(\frac{b_{min\,j}}{\sigma_{T_j}}, 1\right)}(t)dt$$

$$P_{MD} = F_{\mathcal{N}\left(\frac{b_{min\,j}}{\sigma_{T_j}}, 1\right)}(T_d)$$

Thus, by setting the value of $P_{MD}$ and knowing that of $T_d$, we can compute $b_{min\,j}$. In the same way, all the different $b_{min\,i}$ can be computed.

In order to determine the normal law $$\mathcal{N}\left(\frac{b_{min\,j}}{\sigma_{T_j}}, 1\right),$$

provision is advantageously made for the memory 101 of the data merging module 100 to contain the different values of $\sigma_i$, for each of the sensors i available.

Each step $60_1$, $60_2$, $60_3$, respectively $60_4$, is followed by a step $61_1$, $61_2$, $61_3$, respectively $61_4$ of computing an indicator $I_{d1}$, $I_{d2}$, $I_{d3}$, respectively $I_{d4}$. The indicator $I_{d1}$, $I_{d2}$, $I_{d3}$, respectively $I_{d4}$ corresponds to the error introduced on the final estimation $\hat{x}$, by a failure (not detected) of the sensor of interest $C_1$, $C_2$, $C_3$, respectively $C_4$, this failure being characterized by a bias corresponding to the minimum detectable bias.

In a step 62, the greatest indicator, which corresponds to the error of integrity of the final estimation $\hat{x}$, denoted $RP_1$, is sought. The error of integrity of the final estimation $\hat{x}$, also called "radius of protection with failure", denotes the error on the computation of the final estimation of the parameter, assuming that a sensor used is affected by a failure not detected by the method described previously.

Thus for each sensor of interest j used to compute the final estimation $\hat{x}$, there is a corresponding:

detection deviation $T_j$,
minimum detectable bias $b_{min\,j}$, and
indicator $I_{dj}$ which corresponds to the error introduced on the final estimation $\hat{x}$, by a failure of the sensor of interest j, this failure being characterized by the minimum detectable bias.

The final estimation is here produced by the least squares method. The total measurement error $e_T$ linked to such an estimation is defined by $$e_T = \frac{\sum_{k=1}^{D} w_k e_k}{\sum_{k=1}^{D} w_k}$$

(see equation (9)). The indicator $I_{di}$ then has the value:

$$I_{di} = \frac{w_i b_{min\,i}}{\sum_{k=1}^{D} w_k} \quad (14)$$

In other words, the indicator $I_{di}$ is equal to the minimum detectable bias $b_{min\,i}$ weighted by a weighting coefficient equal to the variance of the centered normal law corresponding to the sensor of interest i, divided by the sum of the inverses of the variances of the centered normal laws associated with each sensor of interest used to compute the final estimation of the parameter.

If appropriate, the coefficients $w_k$, $w_i$ are replaced by the weighting coefficients associated with the sensor k, respectively i, used for the final estimation implemented in the method.

For example, given four sensors of interest formed by two IRS sensors and two AHRS sensors, the following applies (the index I corresponds to an IRS sensor and the index A corresponds to an AHRS sensor):

$$I_{dI} = \frac{w_I b_{min\,I}}{2(w_I + w_A)} \text{ and } I_{dA} = \frac{w_A b_{min\,A}}{2(w_I + w_A)}.$$

Then: $RP_1 = \max(I_{dI}, I_{dA})$.

It can be seen that, if a plurality of sensors of interest are characterized by the same centered normal law, the number of computations needed to determine all the indicators $I_{di}$ is reduced. This comment relates to all the processing operations described throughout the text.

Provision is advantageously made for the memory 101 of the data merging module 100 to contain the different values of $\sigma_i$, for each of the sensors i available.

In some cases, it may be advantageous to adjust the weighting coefficient associated with each measurement in the estimations implemented according to the disclosure herein, in particular in the final estimation of the parameter x.

In effect, if an estimation is made by the least squares method, the weight corresponding to each sensor of interest is inversely proportional to its variance.

The measurement supplied by a sensor of interest of low variance therefore strongly influences the value of the final estimation. In other words, the degree of confidence granted to a sensor of interest of low variance is high.

The drawback is that, if the sensor of interest fails, the error on the final estimation is high, as long as this sensor of interest has not been excluded. In other words, the error of integrity of the final estimation is high (radius of protection with failure).

It is possible to envisage adjusting the weight conferred on a sensor of interest in order to reduce the error of integrity of the final estimation. This is reflected in an increase in the error of accuracy of the final estimation, a drawback compensated by the reduction of the integrity error.

In particular, it will be possible to define the weighting coefficients in such a way as to obtain the minimum integrity error. In other words, the weighting coefficients that minimize the value of the maximum error on the final estimation, introduced by a failure of a sensor of interest used to compute the final estimation, are sought.

For example, in the case where the sensors of interest consist of two AHRS sensors and one IRS sensor, the IRS sensor is the only sensor for which the error follows a centered normal law of low standard deviation. If an estimation is made by the least squares method, the weight associated with the IRS sensor for the estimation $\hat{x}$ is high. Consequently, in the case of failure of this IRS sensor, the error on the estimation $\hat{x}$ is very high as long as the sensor is not excluded.

Thus, the indicator $I_{di}$ as defined previously, associated with the IRS sensor, takes a very high value, and defines the error of integrity of the estimation. This integrity error is all the higher when the minimum detectable bias associated with the IRS sensor is higher in the presence of a single IRS sensor and two AHRS sensors, than in the presence of two IRS sensors and two AHRS sensors.

Two new weighting coefficients $w'_I$, $w'_A$ are therefore sought for the IRS sensor and for the two AHRS sensors, which minimize the maximum error introduced on the final estimation $\hat{x}$, by a failure of a sensor of interest.

The following applies:

$$I_{dI} = \frac{w'_I b_{min\ I}}{2(w'_I + w'_A)} \text{ and } I_{dA} = \frac{w'_A b_{min\ A}}{2(w'_I + w'_A)}.$$

The pair $(w'_I, w'_A)$ which minimizes the maximum out of $I_{dI}$ and $I_{dA}$ is sought.

These weighting coefficients then make it possible to define an estimation that makes it possible to obtain the minimum integrity error (maximum integrity):

$$\hat{x} = \frac{w'_I y_I + w'_A y_{A1} + w'_A y_{A2}}{w'_I + w'_A + w'_A},$$

with $y_I$ being the measurement by the IRS sensor, $y_{A1}$ being the measurement by the first AHRS sensor and $y_{A2}$ being the measurement by the second AHRS sensor.

It will be noted that such an estimation exhibits an error of accuracy that is higher than the estimation by the least squares method.

In other words, the final estimation is a weighted average in which the weights are not variances. A lower weight is assigned to the IRS. The capacity to detect a future anomaly on this IRS is thus prioritised, nevertheless with a consequential slight degradation of the accuracy of the final estimation of the parameter.

Figure 7:
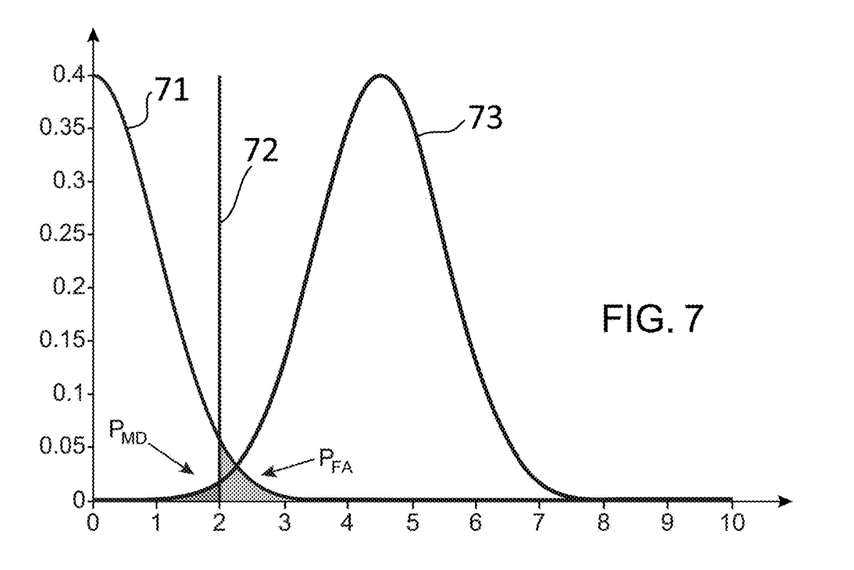
FIG. 7 schematically illustrates a total probability of false alarm and a total probability of wrong detection.

By way of illustration, FIG. 7 shows a total probability of false alarm and a total probability of wrong detection.

The curve 71 represents the centered normal law corresponding to the measurement error on the overall estimation, when all the sensors of interest taken into account for the estimation are operating normally.

The curve 73 represents the normal law corresponding to the measurement error on the overall estimation, when one of the sensors of interest taken into account for the estimation is exhibiting an anomaly.

The horizontal straight line 72 delimits, under the curve 73, to the left of the line 72, an area representative of the probability of wrong detection. The line 72 also delimits, under the curve 71, to the right of the line 72, an area representative of the total probability of false alarm.

Figure 8:
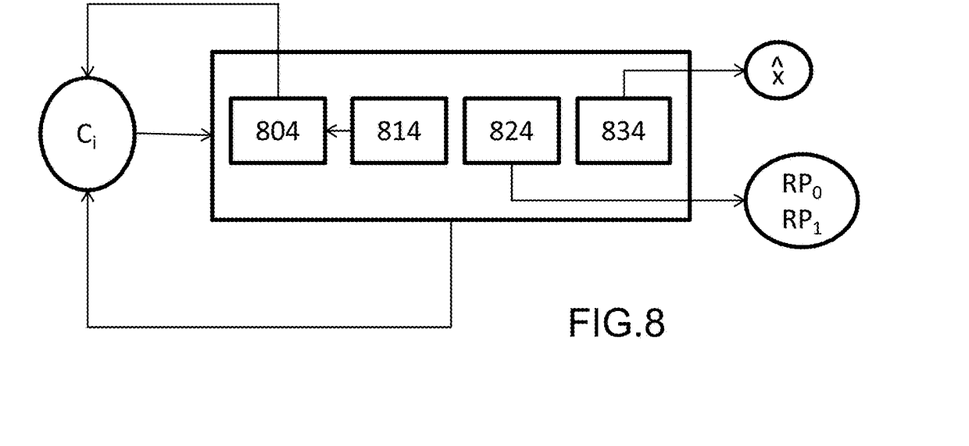
FIG. 8 schematically illustrates a method according to one embodiment of the disclosure herein, implementing at least two successive steps of searching for a possible anomaly on a sensor of interest.

FIG. 8 schematically illustrates steps of a measurements merging method according to the disclosure herein, implementing at least two successive steps of searching for a possible anomaly on a sensor of interest.

The sensors of interest are denoted $C_i$.

The merging module performs a monitoring function referenced 814, consisting in searching, at each instant t, for a possible anomaly on one of the sensors of interest $C_i$. When one of the sensors of interest is identified as exhibiting an anomaly, the monitoring function 814 also makes it possible to determine the sensor of interest $C_P$ which is exhibiting an anomaly.

An exclusion function 804 makes it possible to exclude the sensor $C_P$ from the group of the sensors of interest.

The merging module (see FIG. 1) takes into account the sensors of interest $C_i$, except for a possible excluded sensor $C_P$, to compute a final estimation $\hat{x}$ of the parameter x at the instant t (function 834 called measurement combination function or measurement consolidation function or measurement merging function).

The merging module also computes the accuracy error $RP_0$ at the instant t and the integrity error $RP_1$ at the instant t, associated with the final estimation (function referenced 824). These different values are supplied to a system, notably an avionics system. Provision is advantageously made for the merging module to compute the accuracy error $RP_0$ and the integrity error $RP_1$ only when there are at least three sensors of interest available.

For the identification and exclusion functions to be of real interest, it is advantageous to always have at least three sensors of interest. Provision is preferably made not to implement the identification and exclusion functions when there are no more than two sensors of interest available. It is possible to provide a step of transmission to a system, of a message signalling the fact that there are no more than two sensors of interest taken into account for the final estimation, in order to notify the pilot of the aircraft or a maintenance center.

The exclusion can be immediate, as soon as it has been determined that the sensor of interest $C_P$ is exhibiting an anomaly. As a variant, the exclusion can depend on an exclusion confirmation time. In this case, the sensor $C_P$ is excluded if it is identified as exhibiting an anomaly, at each instant during the exclusion confirmation time. It is possible to provide a step of transmission, to a system, of an identifier of the sensor $C_P$, in order to notify the pilot of the aircraft or a maintenance center that the sensor $C_P$ is failing.

With the sensor $C_P$ excluded, it is no longer taken into account to compute a final estimation $\hat{x}$ of the parameter x, as well as the error of accuracy and the error of integrity of this final estimation. Furthermore, following this exclusion, the monitoring function will monitor only the remaining sensors of interest. A number of successive exclusions can be provided in the case of successive failures of the sensors.

The sensor or sensors previously identified as exhibiting an anomaly can be reinjected into the group of the sensors of interest $C_i$. If the exclusion function does not produce a new sensor exclusion, this means that all the sensors are once again operating normally. It is thus possible to check that a maximum number of the sensors operating normally are taken into account at each instant. This feature is particularly advantageous in combination with a maintenance step on the sensor identified as exhibiting an anomaly. Preferably, all the sensors previously identified as exhibiting an anomaly are reinjected because a number of sensors may revert at the same time to the normal state. In the same way as for the exclusion of a sensor, a reinjection confirmation time can be provided. A sensor is once again taken into account for the computation of the final estimation of the parameter x if it is not considered as exhibiting an anomaly, at each instant during the reinjection confirmation time.

The reinjection of sensors previously identified as exhibiting an anomaly exhibits an increased interest when no more than two sensors of interest are available, and the presence of an anomaly has been detected on one of these two sensors of interest. In this case, the sensor of interest exhibiting an anomaly cannot be identified then excluded. It is, however, possible to reinject sensors of interest, so as to have, ultimately, at least three sensors of interest, then making it possible to identify and exclude the one exhibiting an anomaly.

Provision can be made for the exclusion to be immediate, and for the reinjection to be linked to a reinjection confirmation time, in order to avoid any instability at an anomaly situation limit.

As already specified above, it is assumed that, at each instant t, there is at most one sensor failing. At a given instant t, and after having excluded a failing sensor, no effort is made to exclude a second sensor before computing the final estimation. The exclusion of a possible second failing sensor will then be performed at the instant t+1.

The measurements merging method according to the disclosure herein offers the advantage of allowing for a rigorous characterization of the final estimation produced. It is in fact possible to easily determine an error of accuracy and/or an error of integrity of the final estimation. Furthermore, the probability of false alarm linked to the final estimation is known, as is a probability of wrong detection linked to the computed integrity error. Depending on its needs, for example in terms of accuracy and/or integrity, each system will be able to use or not use the final estimation provided at an instant t.

By virtue of the exclusion of the failing sensors and of a rigorous characterization of the final estimation, estimations are easily obtained that definitely exhibit a low accuracy error and/or a low integrity error. The systems that require a certain level of accuracy and/or of integrity will be able to use these final estimations. Thus, the disclosure herein increases the availability of the final estimations that can be supplied to the systems. It will then be possible to envisage new functions by virtue of the provision of these final estimations that definitely exhibit a great accuracy (low accuracy error) and/or a great integrity (low integrity error).

Since the accuracy and/or the integrity of the final estimations is controlled, it is no longer necessary to overdimension the number and/or the technical complexity of the sensors used.

Figure 9:
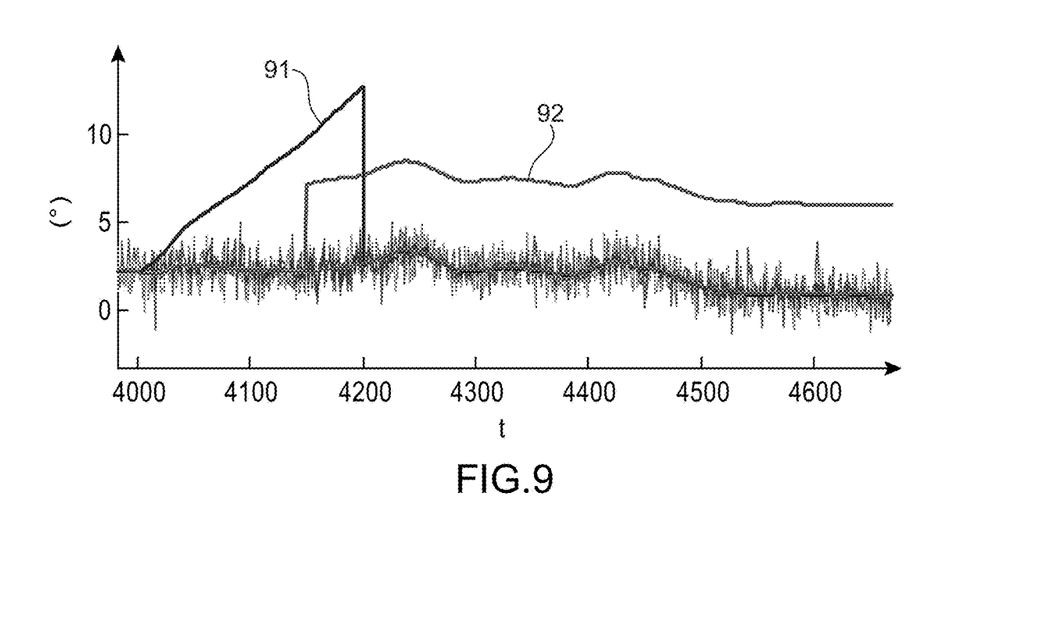
FIG. 9 illustrates an exemplary implementation of the method according to the disclosure herein.

FIG. 9 illustrates an exemplary implementation of the method according to the disclosure herein, performed on the basis of real flight data.

The abscissa axis corresponds to the time. The ordinate axis corresponds to the value of the pitch angle in degrees.

The sensors of interest are two IRS sensors and two AHRS sensors.

The curve 91 represents the value measured by a first IRS sensor, which exhibits a failure characterized by a bias of ramp form between the times t=4000 and t=4200.

The curve 92 represents the value measured by the second IRS sensor, which exhibits a failure characterized by a constant bias counted from the time t=4150.

Other curves are very close and represent the values measured by the two AHRS sensors, the real value and the value estimated using the method according to the disclosure herein, implementing an estimation by the least squares method and the search for, identification and exclusion of a sensor exhibiting a failure.

It can be seen that the estimated value remains very close to the real value, even when one of the IRS sensors fails, and even when the two IRS sensors fail successively.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

What is claimed is:

1. A method for merging measurements of a flight parameter of an aircraft, from measurements of the flight parameter supplied respectively by a plurality of sensors, the method comprising:
    searching, by a data merging module implemented on at least one processor, for a possible anomaly on one out of the plurality of sensors, wherein searching comprises:
    for each sensor, computing a detection deviation, proportional to the absolute value of a difference between a measurement supplied by the sensor and an estimation of the flight parameter computed from the measurements supplied by the other sensors that excludes the measurement supplied by the sensor;
    for each sensor, comparing the respective detection deviation for the sensor to a corresponding predetermined threshold;
    based on the result of the comparisons, determining the presence or the absence of an anomaly on one of the sensors with a determined total probability of false alarm; and
    merging, by the data merging module, measurements supplied by the sensors to provide a final estimation of the flight parameter; and
    transmitting, by the data merging module, the final estimation of the flight parameter to an avionic system of the aircraft.

2. The method according to claim 1, wherein searching for a possible anomaly comprises searching for a possible anomaly on one out of at least three sensors of interest, and further comprises determining a presence of an anomaly on a first sensor, and wherein merging measurements comprises excluding a first measurement supplied by the first sensor in the estimation of the flight parameter as a result of determining the presence of the anomaly on the first sensor.

3. The method according to claim 2, wherein merging measurements comprises excluding a first measurement supplied by the first sensor in the estimation of the flight parameter, as a result of determining the presence of the anomaly on the first sensor at each measurement instant during a predetermined time.

4. The method according to claim 2, wherein determining the presence of the anomaly on the first sensor comprises:
    for each sensor, determining an estimation of the flight parameter, from the measurements of the flight parameter supplied by the other sensors, the sensor being excluded;
    for each estimation, determining a residual value based on distances between the measurements supplied by the other sensors and the estimation; and
    searching for a minimum residual value and determining the presence of the anomaly on the first sensor as a result of the residual value for the first sensor being the minimum residual value.

5. The method according to claim 1, wherein, for each sensor, the detection deviation is proportional to the absolute value of a difference, divided by the standard deviation of a centered normal distribution characterizing, in the absence of anomaly on the sensors, the difference between a measurement supplied by the sensor and an estimation of the flight parameter computed from the measurements supplied by the other sensors.

6. The method according to claim 1, wherein, for each detection deviation, the predetermined threshold is determined from a desired probability of false alarm corresponding to the probability of determining, from this detection deviation, the presence of an anomaly on one of the sensors of interest, although this anomaly does not exist.

7. The method according to claim 1, wherein each of the estimations of the flight parameter is a weighted average of measurements each supplied by a sensor.

8. The method according to claim 7, wherein each measurement supplied by a sensor is weighted by the inverse of a variance of a normal distribution characterizing a total measurement error relating to the sensor, in the absence of anomaly on the sensor.

9. The method according to claim 7, wherein the final estimation of the flight parameter is a weighted average of measurements each supplied by a sensor and each being weighted by a respective coefficient to obtain a minimum integrity error on the final estimation, introduced by an anomaly of a sensor of interest used to compute the final estimation.

10. The method according to claim 7, comprising determining an error of accuracy of the final estimation, comprising:
    determining a normal distribution that characterizes a total measurement error associated with the final estimation, in the absence of anomaly on the sensors taken into account for the final estimation;
    setting a value for a probability that the absolute value of the total measurement error associated with the final estimation is greater than a threshold to be determined;
    determining the value of the threshold based on the value for the probability.

11. The method according to claim 7, wherein, for each sensor:
    a probability of wrong detection is set, that is common to all the sensors, corresponding to the probability of determining the absence of an anomaly on one of the sensors, although this anomaly exists on the sensor; and
    a value of the minimum detectable bias is determined based on the probability of wrong detection, corresponding to the smallest bias introduced by an anomaly of the sensor, on the measurement that it supplies, so that the presence of an anomaly on one of the sensors of interest can be determined with the probability of wrong detection as set.

12. The method according to claim 11, comprising determining an error of integrity of the final estimation, comprising:
    for each sensor used to compute the final estimation, computing an error indicator value proportional to the error introduced on the final estimation, by a failure of the sensor, this failure being characterized by a bias corresponding to the minimum detectable bias;
    determining the error of integrity of the final estimation as the greatest error indicator value.

13. The method according to claim 1, wherein searching for a possibly anomaly comprises determining the presence of an anomaly on a first sensor of the plurality of sensors, and wherein the method further comprises receiving new measurements from the plurality of sensors and excluding, as a result of determining the presence of the anomaly on the first sensor, a respective new measurement from the first sensor in determining a new final estimation of the flight parameter.

14. The method according to claim 1, wherein searching for a possibly anomaly comprises determining the presence of an anomaly on a first sensor of the plurality of sensors, and wherein the method further comprises receiving new measurements from the plurality of sensors and considering a respective new measurement from the first sensor in determining a new final estimation of the flight parameter, including computing a new detection deviation for the new measurement from the first sensor even though the presence of the anomaly on the first sensor was previously determined.

* * * * *